(12) United States Patent
Schmuck et al.

(10) Patent No.: US 7,516,670 B2
(45) Date of Patent: Apr. 14, 2009

(54) MULTI-CHANNEL MANOMETER WITH INDEPENDENT FLUID LEVEL ADJUSTMENTS

(76) Inventors: Cory D. Schmuck, 21920 Cadrona Ct., Palo Cedro, CA (US) 96073; John J. Malcolm, 1704 Carleton Ct., Redwood City, CA (US) 94061; James A. Rice, 416 Vista Verde Way, Portola Valley, CA (US) 94028

( * ) Notice: Subject to any disclaimer, the term of this patent is extended or adjusted under 35 U.S.C. 154(b) by 0 days.

(21) Appl. No.: 11/870,767

(22) Filed: Oct. 11, 2007

(65) Prior Publication Data

US 2008/0087096 A1  Apr. 17, 2008

Related U.S. Application Data

(60) Provisional application No. 60/829,223, filed on Oct. 12, 2006.

(51) Int. Cl.
*G01L 7/18* (2006.01)
(52) U.S. Cl. ........................................................ 73/747
(58) Field of Classification Search .................... 73/747
See application file for complete search history.

(56) References Cited

U.S. PATENT DOCUMENTS

| 1,812,152 | A | | 6/1931 | Jensen | |
| 1,917,846 | A | | 7/1933 | Klopsteg | |
| 2,494,936 | A | | 1/1950 | Edelen | |
| 3,459,032 | A | | 8/1969 | Yamaguchi | |
| 3,538,933 | A | * | 11/1970 | Miller | 137/806 |
| 3,921,454 | A | * | 11/1975 | Reames IV | 73/747 |
| 4,455,876 | A | | 6/1984 | McPherson | |
| 4,483,186 | A | | 11/1984 | Parel | |
| 4,563,892 | A | | 1/1986 | D'Aoust | |
| 4,683,756 | A | * | 8/1987 | Derleth et al. | 73/747 |
| 4,976,155 | A | * | 12/1990 | Challandes | 73/861.19 |
| 5,895,862 | A | * | 4/1999 | Peabody | 73/747 |

* cited by examiner

*Primary Examiner*—Andre J Allen
(74) *Attorney, Agent, or Firm*—Patent Law Office of Larry Guernsey; Larry B. Guernsey

(57) ABSTRACT

A manometer for multi-channel pressure measurement is presented which includes two or more manometer channels, where each channel includes an independent fluid level adjustment. Also included is a method for calibrating multiple channel carburetors using a manometer having multiple channels each having an independent fluid level adjustment.

20 Claims, 6 Drawing Sheets

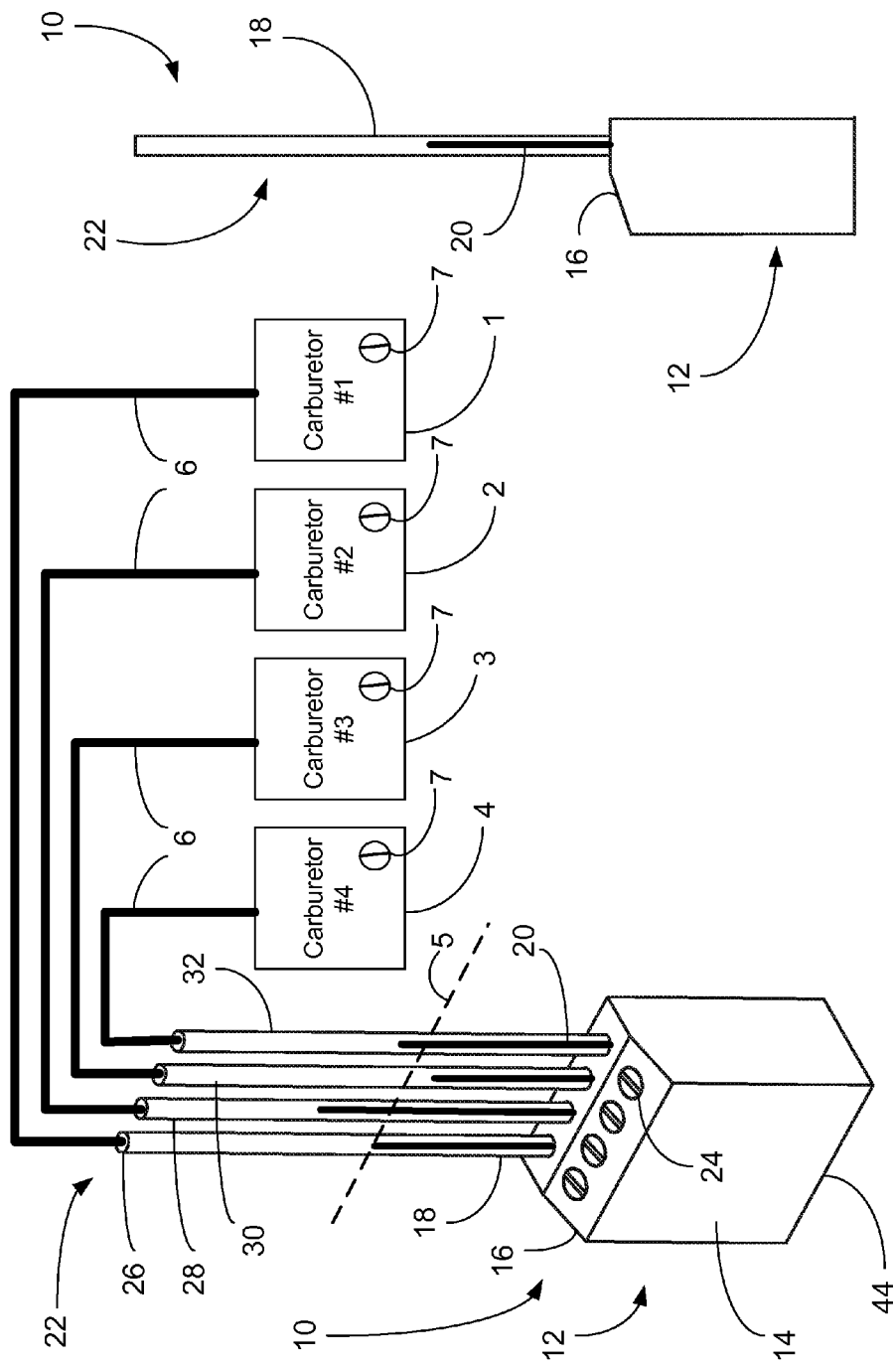

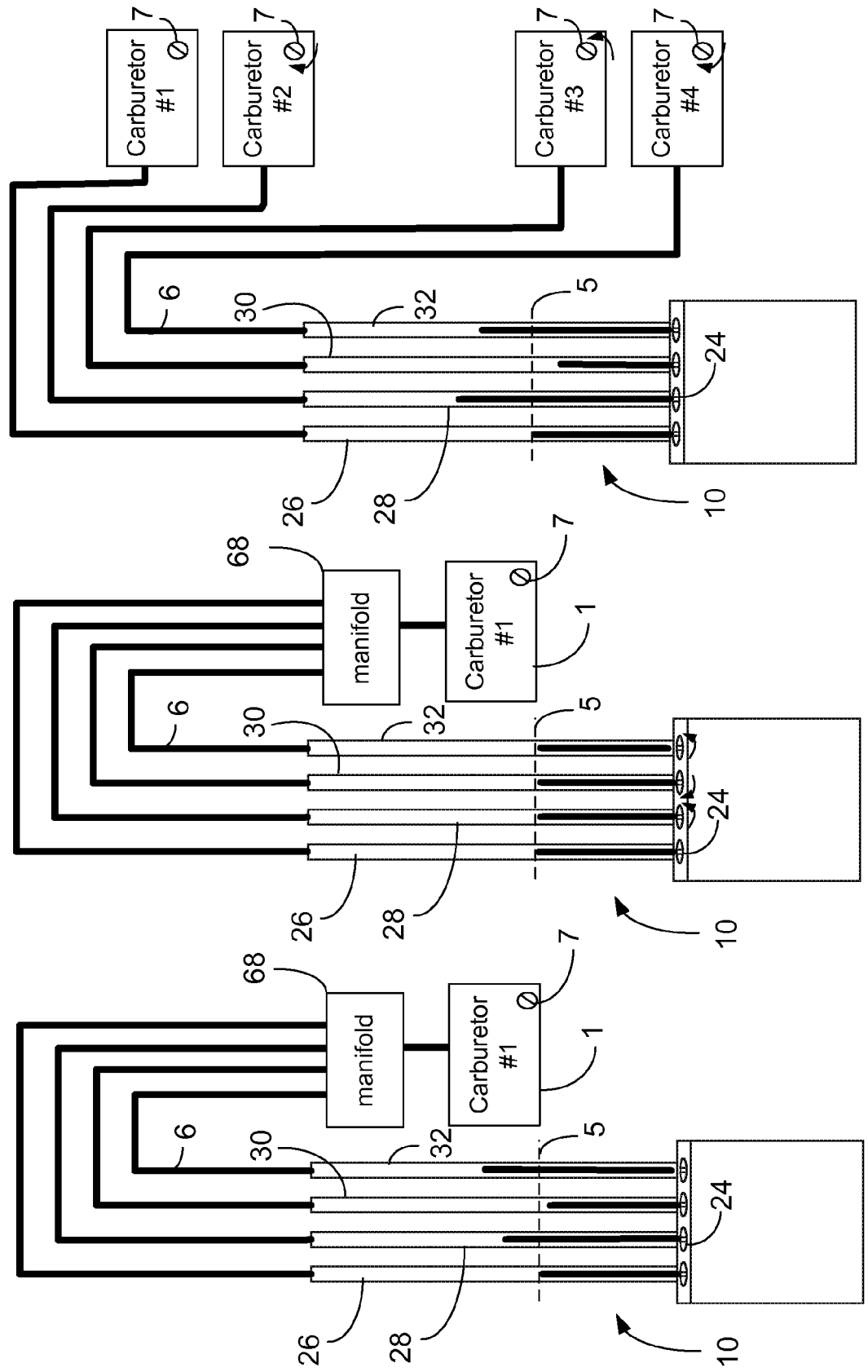

ated carburetors, so it would have to be an iterative process, which would be very time consuming and with less assurance of success. It would be easier and more efficient to be able to monitor all

MULTI-CHANNEL MANOMETER WITH INDEPENDENT FLUID LEVEL ADJUSTMENTS

The following is a non-provisional patent application which claims priority to provisional application 60/829,223 filed Oct. 12, 2006 by the same inventors.

TECHNICAL FIELD

The present invention relates generally to devices for measurement of pressure and more particularly to manometers for synchronization of engine carburetors.

BACKGROUND ART

The carburetor is a device that mixes air and fuel for an internal combustion engine. The majority of motorcycles and many snowmobiles and outboard motors still are carbureted due to lower weight and cost compared to fuel-injected engines. Some carbureted engines have a single carburetor, though the modern trend is to use multiple carburetors, of two to eight carburetors. The carburetor works on Bernoulli's principle, which is that moving air has lower pressure than still air, and that the faster the movement of the air, the lower the pressure. The throttle or accelerator controls the amount of air that flows through the carburetor. Faster flows of air entering the carburetor draws more fuel into the carburetor due to the partial vacuum that is created. To function correctly under all conditions, most carburetors require tuning, and for engines with multiple carburetors, it is important that the carburetors be tuned together to provide balanced performance.

A manometer is a pressure measuring instrument which is typically used when adjusting carburetors, whether single or multiple. It uses a column of liquid whose height in a glass tube indicates the pressure which is applied to the openings of the tube. Manometers can be of the type referred to as an "open-end manometer" which is generally "U-shaped" and has both ends open. One of the open ends is typically open to atmospheric pressure and the other end is then connected to a pressure source to be measured. By comparing the levels in the two legs of the U structure, the pressure of the pressure source can be measured compared to atmospheric pressure.

The second type of manometer in common use is referred to as a "closed-end manometer", where one end is closed and thus a vacuum source connected to the open end pulls against the liquid in the closed tube. This generally gives a measurement of pressure which is lower than atmospheric pressure.

When using manometers or other pressure measurement devices in tuning multiple carburetors in a vehicle, the goal is generally to have the air flow (and thus pressure) in each of the carburetors match as closely as possible to each other. Since it is the relative pressure in each carburetor with respect to each other that is important, the absolute pressure in each channel is not usually a concern. Thus, the purpose of using a manometer for pressure measurement is generally to equalize the pressures in all of the carburetors. It may be possible to do this with a single channel manometer, by noting the pressure in a first carburetor and then connecting the single channel manometer to each successive carburetor in turn, but this is a time consuming and inefficient method because carburetor adjustments affect engine performance and engine performance affects the pressure of previously adjusted carburetors, so it would have to be an iterative process, which would be very time consuming and with less assurance of success. It would be easier and more efficient to be able to monitor all carburetors simultaneously, especially in cases where there may be some cross-effect, whereby the adjustment of a second carburetor affects the performance of the first.

Additionally, it would be an advantage if the fluid-level line in each of the channels of a multi-channel manometer could be individually adjusted, so that there would be maximum flexibility in the calibration of the multi-channels with respect to each other and to a pressure source, such as one of the carburetors in a multi-carburetor engine.

Thus, there is a need for a multi-channel manometer with independent channel fluid-level adjustments for calibration.

DISCLOSURE OF INVENTION

Accordingly, it is an object of the present invention to allow for the tuning of multiple carburetors with a single device.

Another object of the invention is to provide a manometer with multiple channels.

And another object of the invention is to provide a manometer with multiple channels which each have a fluid-level adjustment.

A further object of the present invention is to provide multiple manometer channels which can be adjusted in relation to each other independently.

An additional object of the present invention is to provide a manometer which does not use mercury as a level indicator fluid.

Yet another object of the present invention is to provide a tool in which multiple manometers are grouped together in a single device.

Another object of the present invention is to provide a manometer with multiple channels that can be used independently. The tool can be used as a 1, 2, 3, or 4 channel manometer.

Briefly, one preferred embodiment of the present invention is a manometer for multi-channel pressure measurement which includes two or more manometer channels, where each channel includes an independent fluid level adjustment. Also included is a method for calibrating multiple carburetors using a manometer having multiple channels, each having an independent fluid level adjustment.

An advantage of the present invention is that multiple carburetors on the same or separate vehicle can be adjusted simultaneously.

Another advantage of the present invention is that multiple pressure-measuring devices are grouped in a single device so that they may be easily compared side-by-side.

And another advantage of the present invention is that each of the multiple channels is independently adjustable to set a reference-line for each, or to set a common reference-line used by all channels.

A further advantage of the present invention is that adjustment screws for each channel are grouped in a configuration that is easily accessible for manipulation.

A yet further advantage is that the multiple manometer channels are grouped in a free-standing housing that provides a stable base of support for the manometers.

Another advantage of the present invention is the free standing housing provides reference marks so the user can clearly see when the fluid-levels of the multiple channels are aligned.

And another advantage of the present invention is that each channel is independent of the other channels allowing the user to use as few or as many of the channels as they need.

A further advantage of the present invention is that the manometer does not have to be kept in the upright position while being used or stored to prevent the level indicator fluid from running out of the reservoirs.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 1 shows an isometric view of the multi-channel manometer of the present invention;

FIG. 2 shows a side plan view of the multi-channel manometer of the present invention;

FIGS. 6-8 show front plan views of the adjustment of carburetors using the multi-channel manometer of the present invention;

BEST MODE FOR CARRYING OUT THE INVENTION

Figure 3:
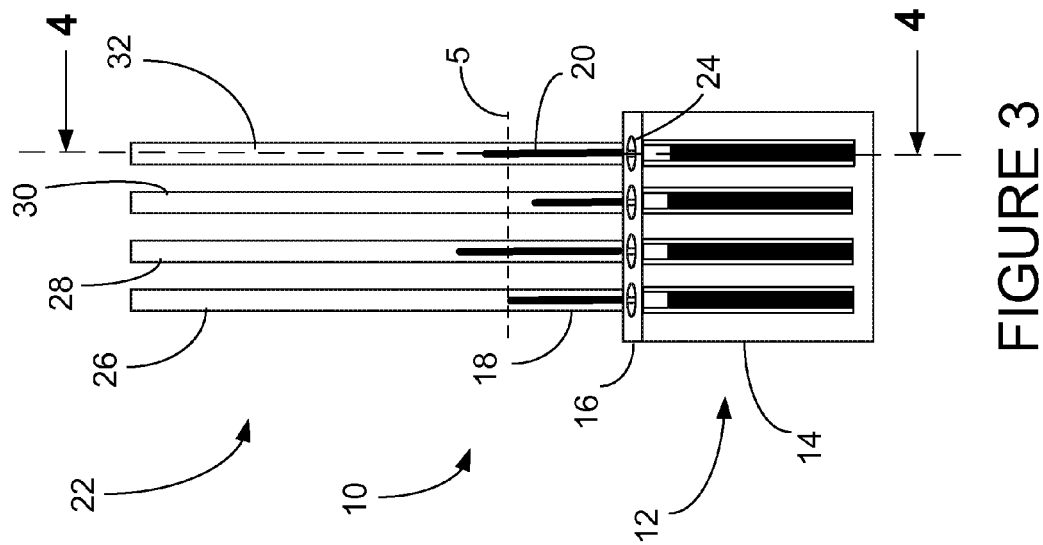
FIG. 3 shows a front plan view of the multi-channel manometer of the present invention.

The present invention is an adjustable multi-channel manometer, which will be referred to by the reference number 10, and thus, for simplicity, shall be referred to as manometer 10. A first preferred embodiment of the manometer 10 is illustrated in FIGS. 1-5, of which FIG. 1 is a perspective view, FIG. 2 is a side plan view, and FIG. 3 is a front plan view. Generally, the manometer 10 includes a housing 12 having a front face 14 which includes a slanted panel 16. The housing 12 is preferably, but not necessarily, translucent or transparent, so the fluid levels in the housing 12 may be observed. A number of manometer tubes 18 are grouped in the housing 12, and each manometer tube 18 includes a column of manometer fluid 20. The tubes 18 and fluid 20 are included in each of the manometer channels 22, along with other elements which will be discussed below. The slanted panel 16 includes a number of adjustment screws 24, of which there is one for each of the manometer channels 22. These adjustment screws 24 are important for setting the reference line 5 in each channel 22, as will be discussed below.

Four manometer channels 22 are shown in the embodiment of FIG. 1. These shall be referred to as channel #1 26, channel #2 28, channel #3 30 and channel #4 32. It shall be understood by those skilled in the art that the number of channels is not restricted to four. There could be as few as two channels, and the number of channels could be eight or more, depending on the number of devices which are intended to be calibrated. The multi-channel manometer 10 could be used to tune two carburetors on a vehicle, or could be used to tune eight carburetors on 8 vehicles, etc. Thus, the numbers of channels shown in the illustrations are not to be construed as limitations.

FIG. 1 also shows four carburetors, designated as carburetor #1, designated element 1, carburetor #2 2, carburetor #3 3, and carburetor #4 4. Carburetor #1 1 is shown to be connected to manometer channel #1 26 by a vacuum line 6, and the other carburetors 2, 3, 4 are shown to be connected to channels 28, 30, 32 respectively in a similar manner. Each carburetor 1, 2, 3, 4 includes its own adjustment mechanism 7 which controls the air flow in the carburetor in order to tune its performance. The goal in tuning multiple carburetors in a vehicle is generally to have the air flow in each carburetor match as closely as possible to each other. Since it is the relative pressure in each carburetor with respect to each other that is important, the absolute pressure in each channel is not usually a concern. Thus, the purpose of using a manometer for pressure measurement is generally to equalize the pressures in all of the carburetors.

Figure 4:
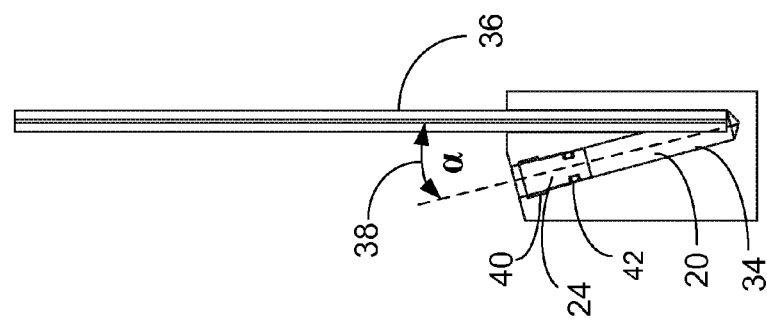
FIG. 4 shows a cross-section view of the multi-channel manometer of the present invention as taken through line 4-4 of FIG. 3.

FIG. 4 is a cross-sectional view of one of the manometer channels 22 as taken through section-line 4-4 in FIG. 3. It can be seen that the interior of housing 12 encloses a portion of the manometer channel 22. The manometer channel 22 thus includes a reservoir 34 which connects to an upright portion 36 at an angle α 38, which can be any one of a great variety of angles, as will be discussed below. The adjustment screw 24 is seated in a threaded connector portion 40, so that the adjustment screw can be easily advanced or retreated down the reservoir 34. The o-ring 42 on the adjustment screw 24 provides a seal between the adjustment screw 24 and the reservoir 34. Thus, when the adjustment screw 24 is advanced in the threaded connector portion 40, it puts pressure on the manometer fluid 20 which forces it higher into the upright portion 36, which is preferably at a height that is above the top of the housing 12, and can be easily seen by the user.

Figure 5:
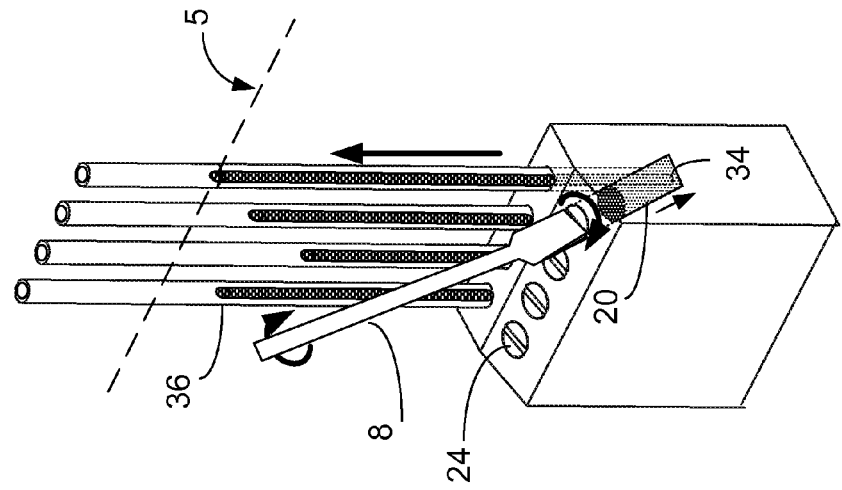
FIG. 5 shows an isometric view of the multi-channel manometer of the present invention showing the adjustment screw manipulation.

This is illustrated in FIG. 5, where an adjustment tool 8, preferably a screwdriver, is shown turning the adjustment screw 24, forcing manometer fluid 20 from the reservoir 34 higher in the upright portion 36. Each channel 22 has its own adjustment screw 24, and is therefore independently adjustable. Thus, the levels of manometer fluid 20 in each channel can be easily calibrated, to set a reference-line 5 for each. This can be done before the carburetors 1,2,3,4 are attached, if some target pressure is desired. Alternately, since the pressure in each channel is important only in a relative sense, the reference-line 5 can be set by attaching each channel 22 to one of the carburetors 1,2,3,4 until all are equal.

The manometer fluid 20 can be of many different types. Some styles of manometers use mercury, since it is a very heavy liquid with a specific gravity of 13.546, and thus a shorter column of fluid is needed in a manometer, relative to lighter fluids. However, mercury is a very toxic material, and involves many safety and disposal problems. Other manometer fluids are available, but their specific gravity ranges from approximately 1.0 to 2.0 which means that the column height is 13 to 6.5 times the equivalent height of mercury when used in an open-end manometer.

As discussed above, the angle α 38 of the reservoir 34 relative to the upright portion 36, is subject to much variation. The presently preferred angle is in a range of 0-90 degrees, but this angle could vary anywhere from 0 degrees, where the manometer channel describes a "U" structure, to a 90 degree right angle structure, to a full 180 degree structure, where the adjustment screws 24 are at the bottom of a straight tube 18, which is in line with the upright portion 36. The angle α 38 and thus the placement of the reservoir 34 and adjustment screws 24 largely depends on what angle the tool will most likely be used in so a static head of manometer fluid 20 remains above the bottom of the tubes 18 and a convenient location to access the adjustment screws 24 for the user. In the present embodiment, the screws were placed at the preferred angle of 15 degrees because the tool is most likely to be used in a vertical or horizontal position. Thus it will be obvious to those skilled in the art that the angle α 38 can be configured wherever depending on the intended use of the tool and so the convenience of the user can be best accommodated.

In the embodiment of FIGS. 1-5, based on the intended use of the tool and for the convenience of the user, the manometer channels 22 are enclosed in the housing 12, which can stand upright upon its housing bottom 44, and the slanted panel 16 is included to more easily provide access to the adjustment screws 24.

The present multichannel manometer 10 can be used for adjusting pressures on multiple devices that require calibrated pressure regulation such as multiple carburetors. FIGS. 6-8 show various stages in the process of tuning multiple carburetors using the multi-channel manometer 10 of the present invention. In FIG. 6, it will be assumed that there are four carburetors to be tuned and that the manometer 10 has four channels 26,28,30,32, as discussed above.

All four channels 26,28,30,32 are first connected to a manifold 68, which takes the pressure from carburetor #1 1 and distributes it to all four of the manometer channels 26,28,30,32. Through the manifold 68, this pressure is applied to all four of the manometer channels 26,28,30,32. At this point, the manometer channels 26,28,30,32 have not been calibrated, so even though they are exposed to the same pressure, they are at various levels, as shown in FIG. 6. The level in manometer channel #1 26 is chosen as a reference, and the reference-line 5, to which the other channels will be tuned, is established as being parallel to this level.

In FIG. 7, the three other manometer channels 28,30,32 are adjusted by their adjustment screws 24 until all four channels 26,28,30,32 are at the reference-line 5 level.

As shown in FIG. 8, the manifold 68 (see FIG. 7) is now detached from the vacuum lines 6 and the carburetors 1,2,3,4 are all attached individually to the four manometer channels 26,28,30,32. As shown, the levels in the manometer channels 26,28,30,32 will now vary again, as the pressure produced by the other un-tuned carburetors 2,3,4 is not uniform, but the reference-line 5 level still remains as a reference. The remaining carburetors 2,3,4 can now be adjusted by their adjustment mechanisms 7 until they all match the reference-line 5 level. The carburetors 1,2,3,4 will now all be synchronized.

It will be understood that there are many other variations of procedure for tuning multiple carburetors which may be practiced using the multi-channel manometer, and these will be obvious to one skilled in the art. The previous method thus is not meant to be a limitation, but an example of one use.

Figure 9:
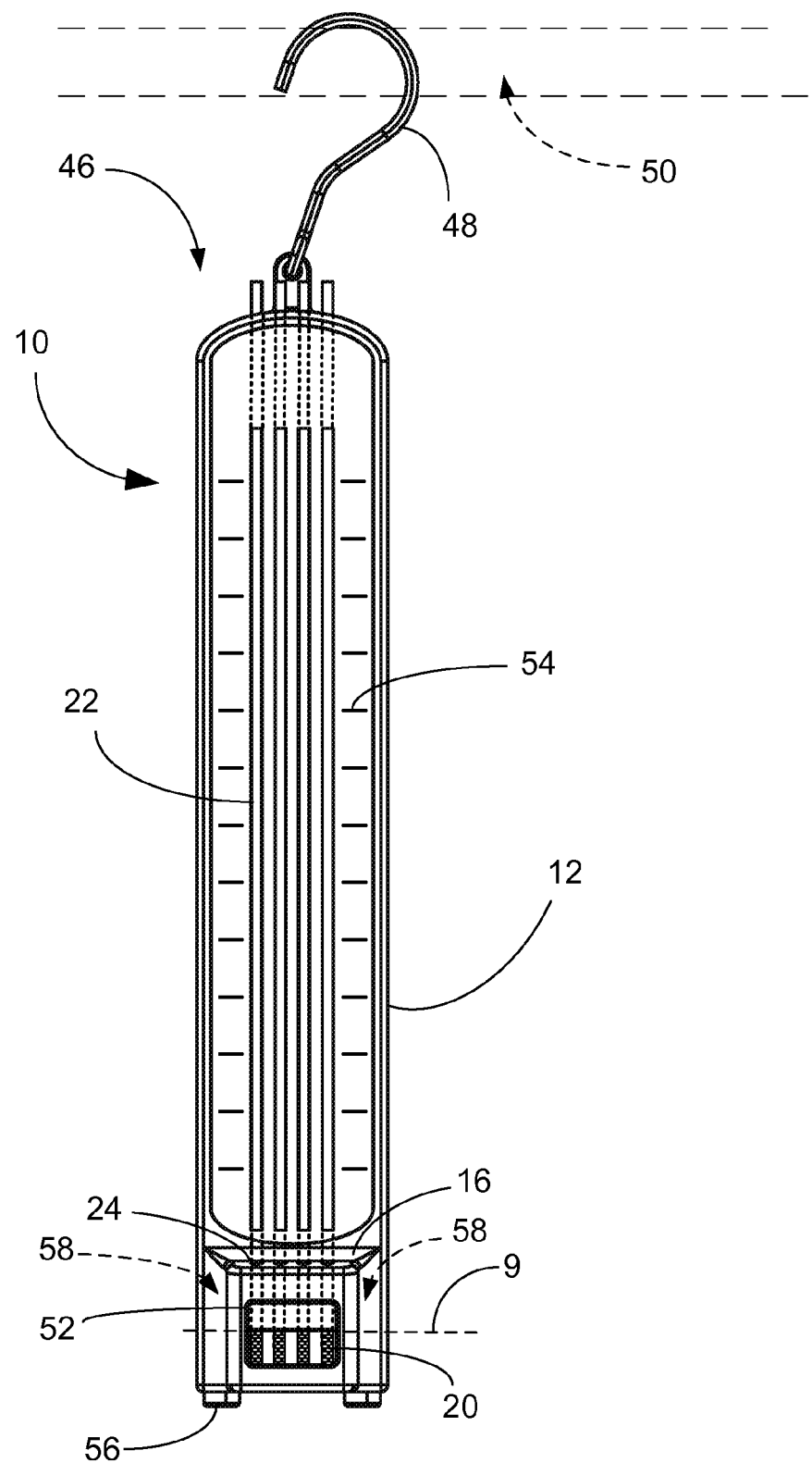
FIG. 9 shows a front plan view of an enclosure for a closed-end manometer of the present invention.

FIG. 9 shows one of many types of enclosure 46 for the multi-channel manometer 10. This type preferably includes a hanging hook 48, by which the enclosure may be hung from handlebars of a motorcycle 50 (represented here by the dashed lines). The bottom of the enclosure 46 preferably includes a window 52, through which the static fluid level line 9 of the manometer fluid 20, can be seen, if the manometer housing 12 is translucent or transparent. Level markings 54 are preferably included to allow easy notation of the relative pressure levels in the manometer channels 22. Removable rubber feet 56 are also preferably included to provide a steady foundation for the manometer 10 when it is not to be hung by its hanging hook 48. Also preferably included are two compartments 58, whose lower ends are closed by the rubber feet 56. These compartments can provide storage space for vacuum caps, carburetor adaptors, lines, or other items when they are not in use. The adjustment screws can be seen at the top of the included slanted panel 16. The enclosure 46 can also be designed to prevent the adjustment screws 24 from being backed to far out of the reservoir 34 causing the o-ring 42 to leak.

It will be obvious to one skilled in the art that many other variations of enclosures are possible, which may take many other shapes and forms. The present illustration is not to be taken as a limitation.

Figure 10:
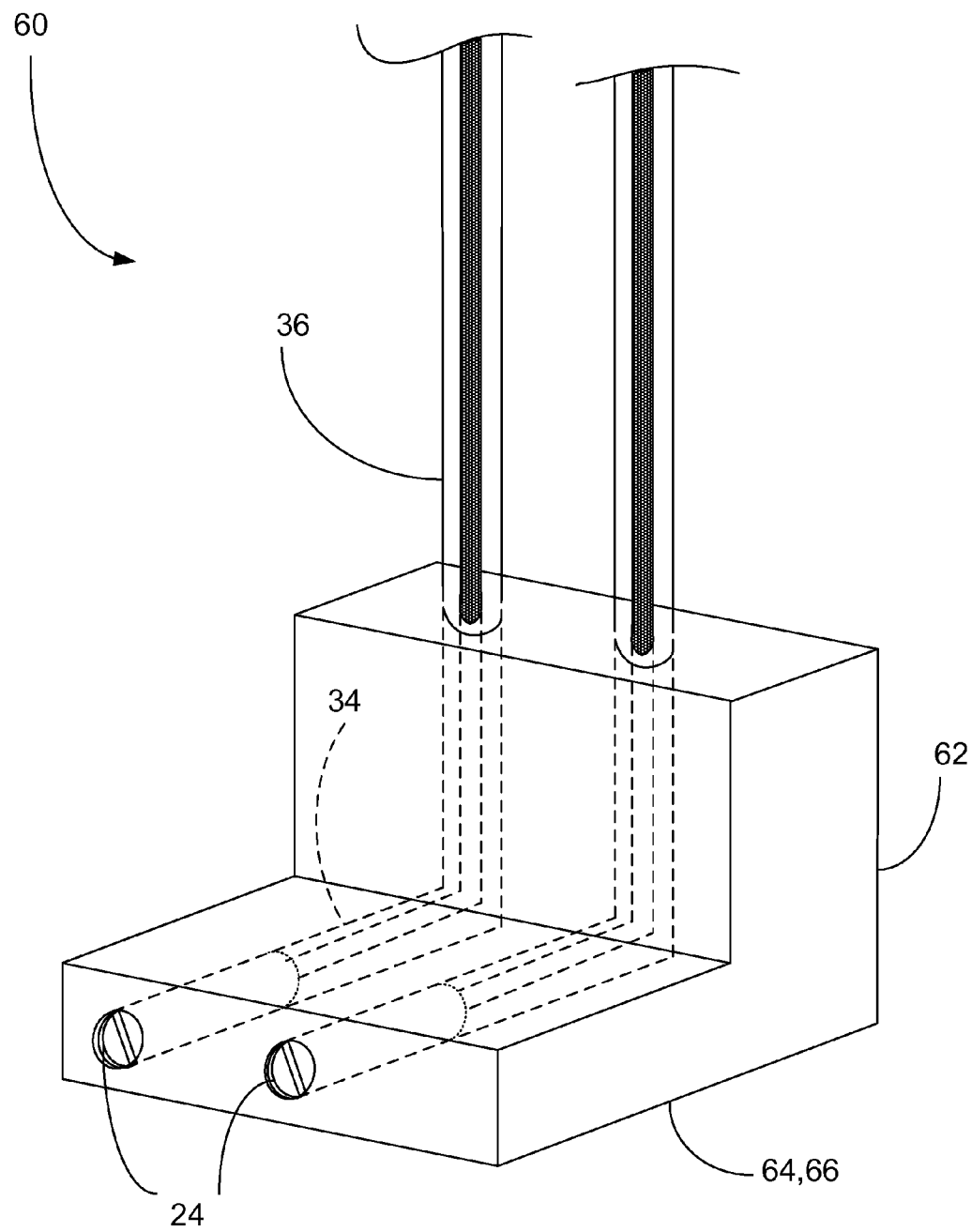
FIG. 10 illustrates an isometric view of an alternative embodiment of a multi-channel manometer.

FIG. 10 illustrates an alternate embodiment 60, in which the reservoir 34 is at right angles (90 degrees) to the upright portion 36, but which functions in a similar manner to that of the previous embodiment. The housing 62 of this embodiment 60 is "L-shaped", so that its housing bottom 64 provides a foot 66 for the device to sit upon. Again, there may be certain advantages to having the adjustment screws 24 presented at this 90 degree angle, which may be more convenient for the user to reach in certain applications. Only two channels are shown in this illustration, but it will be understood that the number of channels may again be eight or more, and that this illustration is not intended as a limitation on the number or dimensions of this embodiment.

Figure 11:
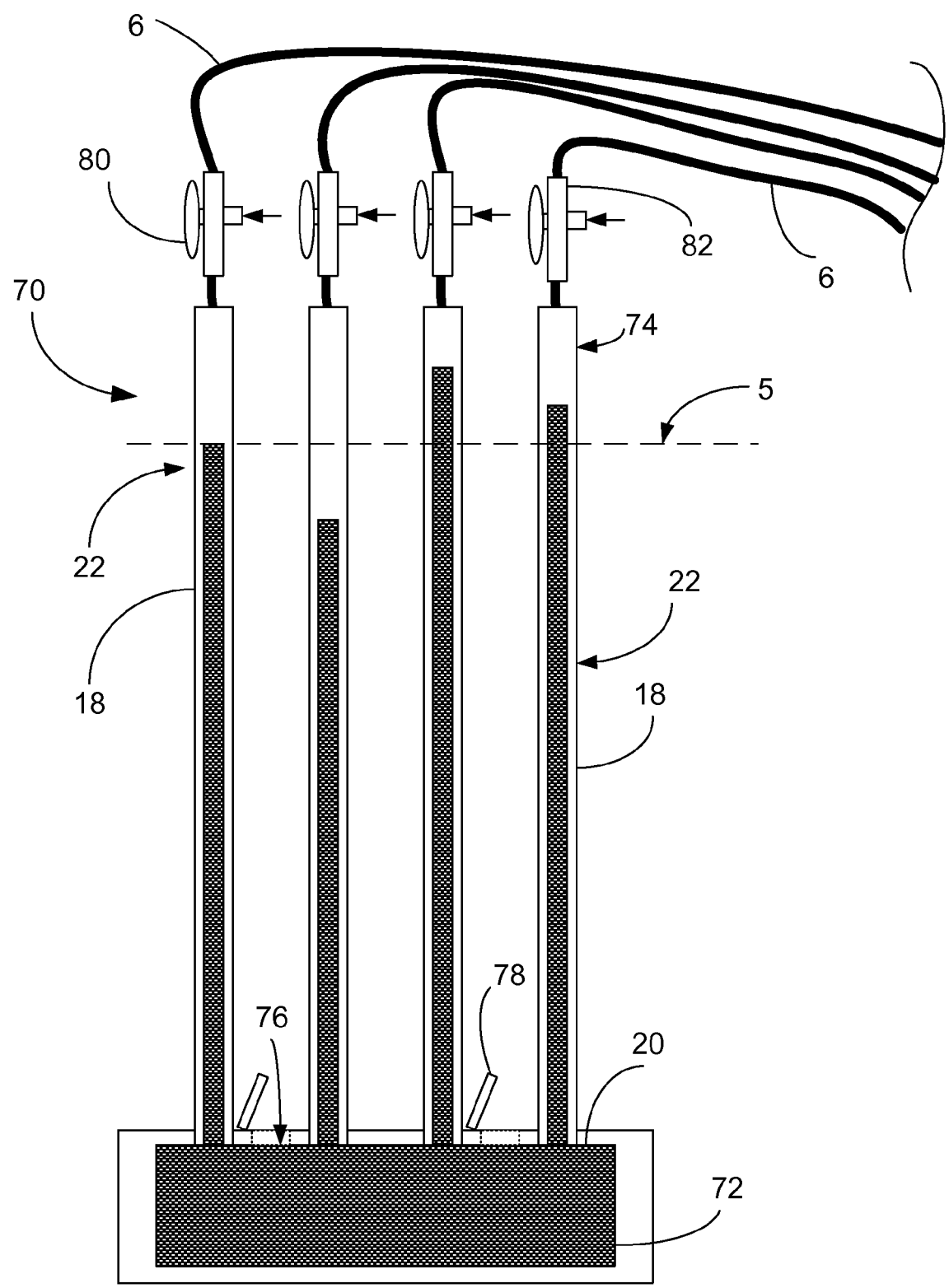
FIG. 11 illustrates a front plan view of a second alternate embodiment of a multi-channel manometer.

FIG. 11 illustrates another alternate embodiment 70 of a multi-channel manometer with independent reference-line adjustments. Again, four manometer channels 22 are shown, although this number is not to be taken as a limitation. This embodiment 70 is an example of an open-end manometer, meaning that the lower end is open to the atmosphere and it must be used in an upright position, rather than being closed, as in the previous embodiments.

The manometer 70 includes a common reservoir 72 of manometer fluid 20, which is drawn up into the manometer tubes 18, when lower than atmospheric pressure is applied to the upper ends 74 of the tubes 18 through vacuum lines 6. As mentioned above, the common reservoir 72 is at least partially open to atmospheric pressure, preferably through holes 76, which may be fitted with removable covers 78 to prevent spillage when the manometer 70 is to be moved, stored or to prevent evaporation.

As referred to above, mercury is used widely as a manometer fluid, but in some states the sale of mercury has been ban because of health and safety concerns. Alternative manometer fluids 20 are lighter in weight than mercury, and thus are easier to draw up into the tubes 18. In order to prevent these manometer fluids 20 from entering the vacuum lines 6 and emptying the common reservoir 72, as reduced pressure draws it out through the upper ends 74, the tubes 18 must be made longer and extend higher into the air, or the applied vacuum pull must be decreased. In order to make the tool a practical height to store and use in a shop environment and to minimize materials and space requirements, it is desirable to keep the tubes 18 short. Thus, mechanisms have been included to "bleed" some of the vacuum pressure (actually to introduce a small amount of air at atmospheric pressure into the tubes) to decrease the vacuum pull (increase the pressure). The vacuum lines 6, which are connected to the carburetors (not shown), are fitted for this purpose with valves 80 which can take many different forms, as will be obvious to those skilled in the art. One preferred type of valve 80 is a needle valve 82, which can be adjusted to introduce a small controlled amount of air into the vacuum line 6, which is indicated by the arrows pointing into the needle valve 82. By adjusting this needle valve 82, the reference-line 5 level can be independently adjusted in each of the channels 22.

Another very simple type of valve 80 is a simple T-connector which attaches to a short tube, which can be crimped to decrease air flow. Many other types of valves can be included including electronically controlled valves, and many types of manual valves.

This alternate embodiment 70 can be used in much the same manner as the other previous embodiments. All channels 22 can be attached to a manifold from a single carburetor, the reference-line 5 levels adjusted, and then the vacuum lines 6 attached to the various carburetors for individual adjustment compared to this reference-line standard.

INDUSTRIAL APPLICABILITY

The present multi-channel manometer 10 is well suited generally for adjusting pressures on multiple devices that require pressure regulation or synchronization such as multiple carburetors on a single motor, or for tuning multiple carburetors on separate motors. When using manometers or other pressure measurement devices in tuning multiple carburetors on a motor, the goal is generally to have the air flow (and thus pressure) in each of the carburetors match as closely as possible to each other. Since it is the relative pressure in each carburetor with respect to each other that is important, the absolute pressure in each channel is not usually a concern. Thus, the purpose of using a manometer for pressure measurement is generally to equalize the pressures in all of the carburetors. It is easier and more efficient to be able to monitor all carburetors simultaneously, especially in cases where there may be some cross-effect, whereby the adjustment of a second carburetor affects the performance of the first.

The present multi-channel manometer 10 allows easy simultaneous adjustment of all carburetors. All four channels 26,28,30,32 are first connected to a manifold 68, which takes the pressure from carburetor #1 1 and distributes it to all four of the manometer channels 26,28,30,32. To calibrate the manometer channels 26,28,30,32, they are exposed to a common pressure, the level in one manometer channel, such as channel #1 26, is chosen as a reference, and the reference-line 5, to which the other channels will be tuned, is established as being parallel to this level. The other manometer channels 28,30,32 are adjusted by their adjustment screws 24 until all four channels 26,28,30,32 are at the reference-line 5 level.

The manifold 68 is now detached from the vacuum lines 6 and the carburetors 1,2,3,4 are all attached individually to the four manometer channels 26,28,30,32. The levels in the manometer channels 26,28,30,32 will now vary again, as the pressure produced by the other un-tuned carburetors 2,3,4 is not uniform, but the reference-line 5 level still remains as a reference. The remaining carburetors 2,3,4 can now be adjusted by their adjustment mechanisms 7 until they all match the reference-line 5 level. The carburetors 1,2,3,4 will now all be synchronized.

It will be understood that there are many other variations of procedure for tuning multiple carburetors which may be practiced using the multi-channel manometer.

There are many types of enclosures 46 for the multi-channel manometer 10. One type preferably includes a hanging hook 48, by which the enclosure may be hung from handlebars 50 of a motorcycle. The bottom of the enclosure 46 preferably includes a window 52, through which the static level 9 of the manometer fluid 20, can be seen, if the manometer housing 12 is translucent or transparent. Level markings 54 are preferably included to allow easy notation of the relative pressure levels in the manometer channels 22. Removable rubber feet 56 are also preferably included to provide a steady foundation for the manometer 10 when it is not to be hung by its hanging hook 48.

Another alternate embodiment 60 is shown in which the reservoir 34 is at right angles (90 degrees) to the upright portion 36. The housing 62 of this embodiment 60 is "L-shaped", so that its housing bottom 64 provides a foot 66 for the device to sit upon.

Yet another alternate embodiment 70 of a multi-channel manometer with independent reference-line adjustments is that of an open-end manometer, meaning that the lower end is open to the atmosphere and it must be used in an upright position, rather than being closed, as in the previous embodiments. This variation of a manometer 70 includes a common reservoir 72 of manometer fluid 20, which is drawn up into the manometer tubes 18, when lower than atmospheric pressure is applied to the upper ends 74 of the tubes 18 through vacuum lines 6. The common reservoir 72 is at least partially open to atmospheric pressure, preferably through holes 76, which may be fitted with removable covers 78 to prevent spillage when the manometer 70 is to be moved, stored or to prevent evaporation.

Alternative manometer fluids 20 may be lighter in weight than mercury, and thus are easier to draw up into the tubes 18. In order to prevent these manometer fluids 20 from entering the vacuum lines 6 and emptying the common reservoir 72, as reduced pressure draws it out through the upper ends 74, the tubes 18 must be made longer and extend higher into the air, or the applied vacuum pull must be decreased. Thus, mechanisms have been included to "bleed" some of the vacuum pressure (actually to introduce a small amount of air at atmospheric pressure into the tubes) to decrease the vacuum pull (increase the pressure). Vacuum lines 6, which are connected to the carburetors are fitted for this purpose with valves 80 including needle valves 82, which can be adjusted to introduce a small controlled amount of air into the vacuum line 6. By adjusting this needle valve 82, the reference-line 5 level can be independently adjusted in each of the channels 22.

Another very simple type of valve 80 is a simple T-connector which attaches to a short tube, which can be crimped to decrease air flow. Many other types of valves can be included including electronically controlled valves, and many types of manual valves. In these alternate embodiments 60,70 all channels 22 can be attached to a manifold from a single carburetor, the reference-line 5 levels adjusted, and then the vacuum lines 6 attached to the various carburetors for individual adjustment compared to this reference-line standard. Thus all variations can provide for easy calibration of multiple carburetors, whether on a single vehicle, or on separate vehicles Other advantages of the present invention include the ability to use manometer fluids with relatively low specific gravities when compared to mercury in a configuration that is compact and economical to manufacture when compared to electronic and other mechanical alternatives.

For the above, and other, reasons, it is expected that the multi-channel manometer 10 of the present invention will have widespread industrial applicability. Therefore, it is expected that the commercial utility of the present invention will be extensive and long lasting.

What is claimed is:

1. A manometer for multi-channel pressure measurement comprising a plurality of manometer channels each channel having an independent fluid level adjustment.

2. The manometer of claim 1, wherein each of said plurality of manometer channels includes a tube which contains manometer fluid.

3. The manometer of claim 2, wherein each said tube includes a reservoir portion and an adjustment mechanism which adjusts fluid levels in each of said plurality of manometer channels.

4. The manometer of claim 3, wherein said adjustment mechanism includes an adjustment screw.

5. The manometer of claim 1, wherein said plurality of manometer channels includes 2 or more channels.

6. The manometer of claim 1, wherein said plurality of manometer channels includes 4 or more channels.

7. The manometer of claim 1, wherein said plurality of manometer channels includes 8 or more channels.

8. The manometer of claim 1, wherein said plurality of manometer channels are grouped together in a housing.

9. The manometer of claim 8, wherein said housing includes a slanted panel.

10. The manometer of claim 1, wherein each of said plurality of manometer channels includes a reservoir and an upright portion.

11. The manometer of claim 10, wherein said reservoir and said upright portion join at an angle $\alpha$.

12. The manometer of claim 11, wherein said angle $\alpha$ lies in the range of 0-180 degrees.

13. The manometer of claim 4, further comprising a threaded connector portion to which said adjustment screw is threadably engaged.

14. The manometer of claim 13, wherein said adjustment screw includes an O-ring.

15. The manometer of claim 9, wherein said adjustment screws are set into said slanted panel of said housing.

16. The manometer of claim 8, wherein said housing includes a hanging hook.

17. The manometer of claim 8, wherein said housing includes rubber feet.

18. The manometer of claim 2, wherein said manometer includes a common reservoir of fluid to which each of said tubes of said plurality of manometer channels are connected.

19. The manometer of claim 18, wherein each said tube is attached to a valve by which fluid level in each of said manometer channels may be adjusted independently.

20. A method for adjusting multiple carburetors to a common pressure, comprising:
  A) providing a manometer having a plurality of channels, where each channel includes an independent pressure level adjustment and an independent pressure level indicator;
  B) attaching all of said plurality of channels to a common pressure source;
  C) choosing one of said channels as a reference channel and noting the level of pressure level indicator of said reference channel to provide a reference level;
  D) adjusting the independent pressure level adjustments of each of said plurality of channels such that said pressure level indicator levels of each of said plurality of channels approximates said reference level of said reference channel;
  E) connecting vacuum lines from each carburetor of said multiple carburetors so that each carburetor is connected to a separate channel of said plurality of channels of said manometer; and
  F) adjusting each of said carburetors until each of said pressure level indicators of said plurality of channels are approximately equal.

* * * * *